United States Patent
Takazawa

(10) Patent No.: US 6,735,559 B1
(45) Date of Patent: May 11, 2004

(54) ELECTRONIC DICTIONARY

(75) Inventor: Kazuhisa Takazawa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 431 days.

(21) Appl. No.: 09/696,770

(22) Filed: Oct. 26, 2000

(30) Foreign Application Priority Data

Nov. 2, 1999 (JP) .......................................... 11-312433

(51) Int. Cl.$^7$ ............................. G06F 17/28; G06F 7/00
(52) U.S. Cl. ..................... 704/7; 704/4; 704/5; 704/10; 707/101
(58) Field of Search ................................. 717/136, 533, 717/532; 707/5, 3, 9, 8; 704/8, 7, 6, 5, 4, 3, 2, 10

(56) References Cited

U.S. PATENT DOCUMENTS

| | | | | |
|---|---|---|---|---|
| 4,654,798 A | * | 3/1987 | Taki et al. ...................... 704/7 |
| 4,912,671 A | * | 3/1990 | Ishida ........................... 704/3 |
| 5,475,586 A | | 12/1995 | Sata et al. ............. 364/419.02 |
| 5,528,491 A | * | 6/1996 | Kuno et al. ..................... 704/9 |
| 5,530,644 A | | 6/1996 | Maruta et al. ......... 364/419.04 |
| 5,787,386 A | | 7/1998 | Kaplan et al. ................. 704/8 |
| 5,854,997 A | * | 12/1998 | Sukeda et al. ................. 704/3 |
| 6,091,415 A | * | 7/2000 | Chang et al. ................ 345/809 |

FOREIGN PATENT DOCUMENTS

| | | | |
|---|---|---|---|
| GB | 2259596 | 3/1993 | |
| GB | 2336694 | * 10/1999 | ........... G06F/17/20 |

OTHER PUBLICATIONS

Microsoft Computer Dictionary, Fourth Edition, 1999, Microsoft Press, p. 348.*

* cited by examiner

Primary Examiner—Vijay Chawan
Assistant Examiner—V. Paul Harper
(74) Attorney, Agent, or Firm—Adams & Wilks

(57) ABSTRACT

An electronic dictionary that can perform model sentence searches at high speed and can search through a plurality of dictionaries at the same time is obtained by providing dictionary daa having sub-information comprising translations corresponding to word entries, model sentences and idiomatic phrases relating to the word entries, and translations of the model sentences and idiomatic phrases, in which as least the model sentence data of the sub-information are extracted from the dictionary data and stored as sub-dictionary data. A pointer is provided at a position in the dictionary data where the sub-information is embedded, and associates respective sub-information with sub-dictionary data.

10 Claims, 8 Drawing Sheets

FIG. 3

| MODEL SENTENCE NO. 1 | This is a pen.<br>THIS IS A PEN. (IN JAPANESE) |
|---|---|
| MODEL SENTENCE NO. 2 | He is a student.<br>HE IS A STUDENT. (IN JAPANESE) |
| | ⋮ |

FIG. 4A

| WORD NO. 1 | a | NEXT WORD NO. 6 | | |
|---|---|---|---|---|
| WORD NO. 2 | a | NEXT WORD NO. 7 | | |
| WORD NO. 3 | He | NEXT WORD NO. 5 | start | MODEL SENTENCE NO. 2 |
| WORD NO. 4 | is | NEXT WORD NO. 1 | | |
| WORD NO. 5 | is | NEXT WORD NO. 2 | | |
| WORD NO. 6 | pen. | NEXT WORD NO. 8 | end | TRANSLATION NO. 1 |
| WORD NO. 7 | student. | NEXT WORD NO. 3 | end | TRANSLATION NO. 2 |
| WORD NO. 8 | This | NEXT WORD NO. 4 | start | MODEL SENTENCE NO. 1 |

| TRANSLATION NO. 1 | THIS IS A PEN. (IN JAPANESE) |
|---|---|
| TRANSLATION NO. 2 | HE IS A STUDENT. (IN JAPANESE) |

FIG. 4B

| MODEL SENTENCE NO. | WORD NO. |
|---|---|
| 1 | 8 |
| 2 | 3 |
| ⋮ | ⋮ |

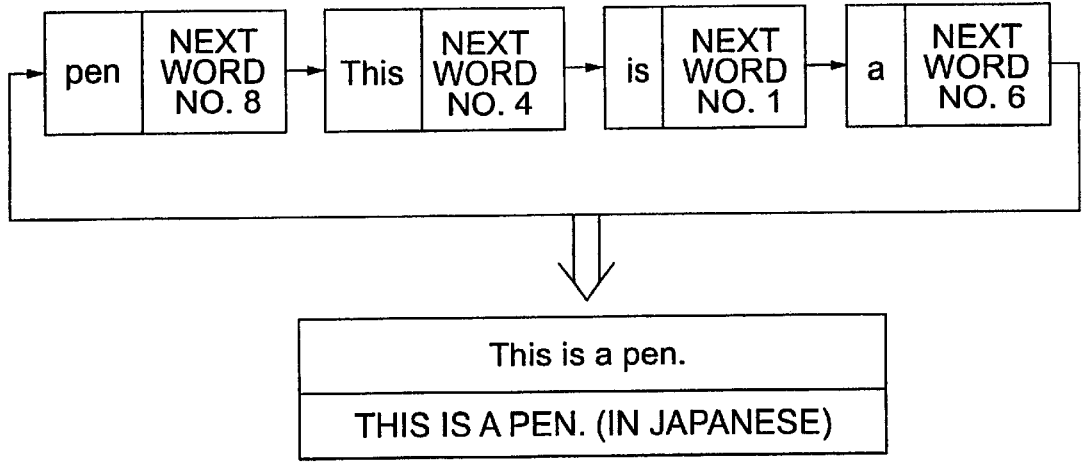

ELECTRONIC DICTIONARY

BACKGROUND OF THE INVENTION

1. Field of the invention

The present invention relates to a display method for an electronic dictionary for representing information etc. relating to translation and words corresponding to input words in English to Japanese, Japanese to English, Japanese or English etc. to be displayed.

2. Description of the Related Art

Conventionally, in an electronic dictionary for displaying information for translation, parts of speech, and synonyms, model sentences, etc., for input words, first of all, characters are input while looking at a display screen, then an execute button for carrying out a search is pressed to change displayed characters, and information for the translation, etc., of the word is displayed on a display screen.

With this type of dictionary, particularly an English to Japanese dictionary, the fact there is a search for idiomatic phrases, model sentences, etc., is useful, but particularly in the model sentence search there is the problem that it takes a long time to perform a search while picking model sentences within a translation, which means that it is not possible to perform a model sentence search at high speed.

Also, for example, in the case of having a plurality of dictionaries, there is a rule that a necessary search is carried out sequentially for each dictionary, and so there is a problem that it takes time and effort.

SUMMARY OF THE INVENTION

The present invention has been conceived in view of the above described problems, and is intended to provide an electronic dictionary that can perform model sentence searches at high speed and that can search through a plurality of dictionaries at the same time.

A first aspect of the present invention for solving the above described problems is an electronic dictionary provided with dictionary data having translations corresponding to word entries and sub-information comprising, model sentences and idiomatic phrases relating to the word entries, and translations of the model sentences and idiomatic phrases, wherein at least the model sentence data of the sub-information are extracted from the dictionary data itself and are held as sub-dictionary data, and a pointer is provided at a position in the dictionary data itself where the sub-information is embedded, and associates respective sub-information with the sub-dictionary data.

In a second aspect of the present invention, the dictionary data contain a plurality of dictionary data items, and the sub-information data is a single item of data.

A third aspect of the present invention is the electronic dictionary of the first or second aspect, in which the sub-dictionary data is provided with model sentence and idiomatic phrase lists.

A fourth aspect of the present invention is the electronic dictionary of the third aspect, in which the lists are made up of words broken down from the model sentences and idiomatic phrases, and each of these words are sorted in a state where restorable restoration data is affixed to each of the model sentences and idiomatic phrases.

A fifth aspect of the present invention is the electronic dictionary of the third or fourth aspects, provided with keyword search means for searching model sentences and idiomatic phrases using the sub-dictionary data.

With the electronic dictionary of the present invention, data for idiomatic phrases and model sentences are extracted from dictionary data and held, which makes it possible to search idiomatic phrases and model sentences, particularly model sentences, at high speed. Also, by appropriately devising the data structure of the idiomatic phrases and model sentences, it will become possible to further increase the speed, and also to reduce the required memory region considerably. Also, by collecting the idiomatic phrase and model sentence data together in a single item and holding it, it is possible to search through model sentences and idiomatic phrases in a plurality of dictionaries together at high speed.

BRIEF DESCRIPTION OF THE DRAWINGS

For a more better understanding of the present invention, reference is made of a detailed description to be read in conjunction with the accompanying drawings, in which:

FIG. 3 is a drawing showing one example of the structure of an electronic dictionary of one embodiment of the present invention;

FIG. 4 is a drawing showing another example of the structure of an electronic dictionary of one embodiment of the present invention;

FIG. 5 is a drawing for describing the data structure of FIG. 4;

DETAILED DESCRIPTION OF THE PREFERRED EMBODIMENTS

Next, the present invention will be described in detail based on embodiments. (First Embodiment)

Figure 1:
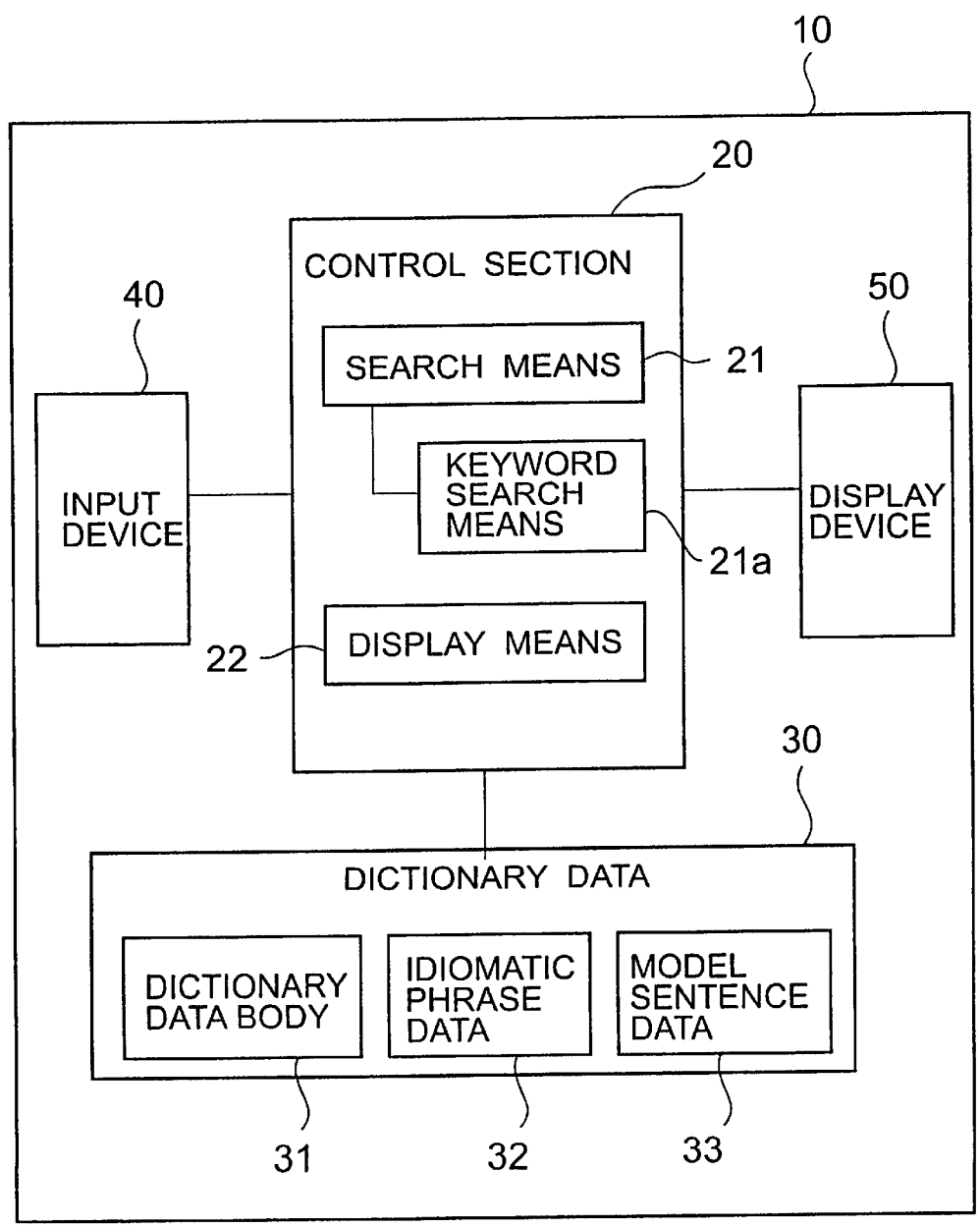
FIG. 1 is a block diagram showing the structure of an electronic dictionary of one embodiment of the present invention.
Figure 2:
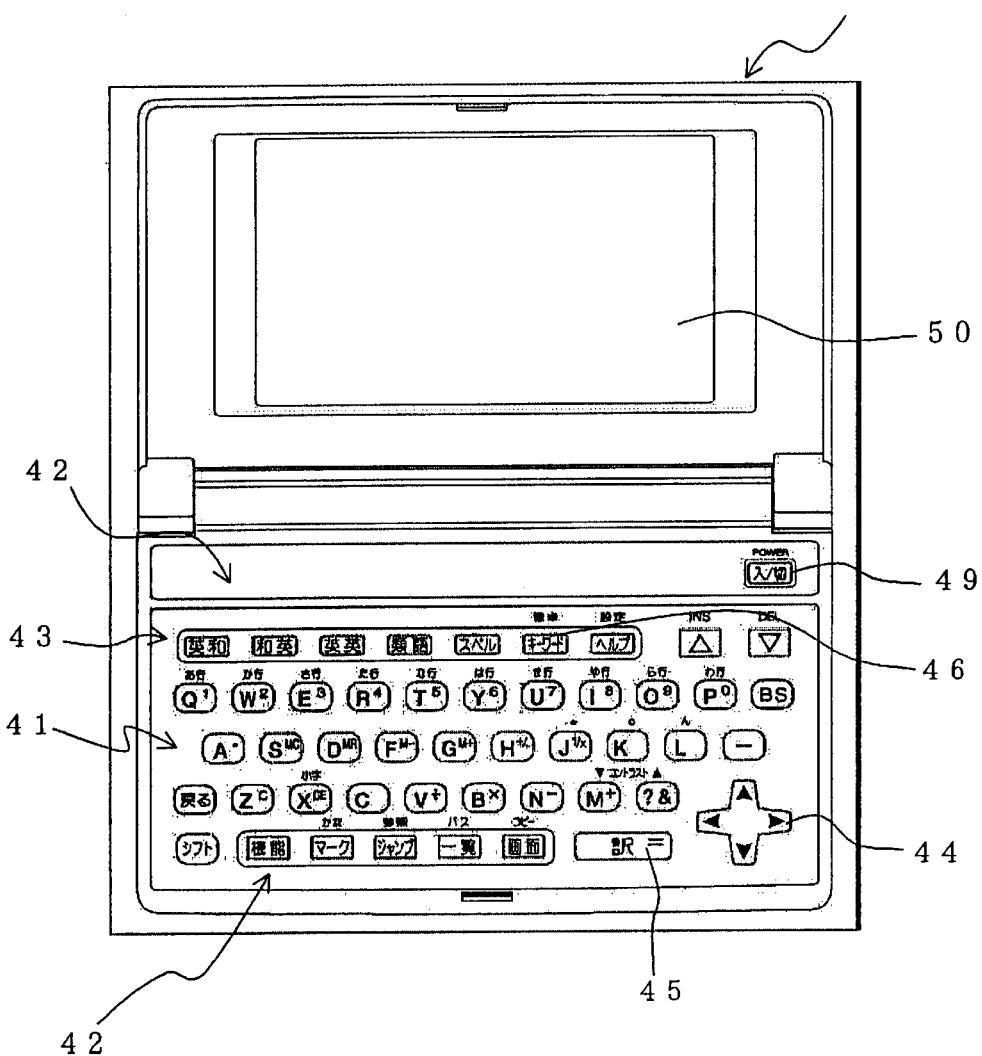
FIG. 2 is a drawing showing the external appearance of the electronic dictionary of one embodiment of the present invention.

FIG. 1 is a block diagram showing a structure of an electronic dictionary of a first embodiment of the present invention, and FIG. 2 is a drawing showing the external appearance of the electronic dictionary.

As shown in the drawings, the electronic dictionary comprises a control section or control unit 20 for executing control of respective sections, dictionary data 30 stored in memory such as ROM, an input device or input unit 40 for carrying out character input and electronic dictionary operations, and a display device 50 for displaying various information.

The control section 20 performs overall control of the electronic dictionary 10 by causing execution of a control program etc. stored in memory such as ROM by a CPU, and mainly comprises search means 21, and display means 22, and the search means 21 includes keyword search means 21a.

In this embodiment, the dictionary data 30 are made up of English to Japanese, Japanese to English, ordinary English, and synonym dictionaries. For example, respective dictionary data 30 for English to Japanese, Japanese to English and ordinary English comprise word entries and their translations, and idiomatic phrases and model sentences using the word entries and word entry comments are included in the translations as sub-information, but are provided with the dictionary data body 31 without the idiomatic phrase and model sentence data, idiomatic phrase data 32 comprised of only data of idiomatic phrases and phrasal verbs (hereinafter referred to simply as idiomatic phrases), and model sentence data 33 comprising only model sentence data.

The input device 40 comprises character keys 41 for inputting characters, selection keys 42 for selecting the type of dictionary and carrying out selection and conformation for selection and translation of word entries and idiomatic phrases etc. and display of model sentences etc., and a power supply switch 49 for switching a power supply on and off. The selection keys 42 include, for example, a dictionary selection key 43 for selecting a dictionary, a cursor key 44 for moving a cursor, and a translation key 45 for displaying and confirming a translation. Further, there is a keyword key 46 for performing keyword searches of idiomatic phrases and model sentences.

The display device 50 is a liquid crystal display device, and can display various information.

The search means 21 searches for word entries corresponding to characters input using the character keys 41 etc. Specifically, in translation mode selected by pressing any one of the "English to Japanese", "Japanese to English", "English to English" or "synonym" dictionary selection keys 43, word entries containing an input character string are searched for from the selected dictionary data 30, and in spell check mode selected by pressing the space key of the dictionary selection keys, similar word entries in the input character string are searched for from the selected dictionary data (this can be selected in advance and can be, for example, both English to Japanese and Japanese to English).

The display means 22 outputs necessary information for advising on each operation and information representing results searched by the search means 21 etc. to the display device 50.

Here, a description will be given of a keyword search that is a merit of the electronic dictionary 10 of this embodiment.

In keyword search mode entered by pressing the keyword key 46, the keyword search means 21*a* carries out a keyword search using the idiomatic phrase data 32 and the model sentence data 33, and carries out a keyword search for idiomatic phrases or model sentences containing the desired keyword.

Here, the idiomatic phrase data 32 and the model sentence data 33 are extracted from the dictionary data body 31 to form separate data, which means that is possible to perform keyword searches of idiomatic phrases and model sentences at high speed using the keyword search means 21*a*. Also, since the respective idiomatic phrases and model sentences are removed from the dictionary data body 31, there is the advantage that memory is saved. Also, a pointer is provided in the idiomatic phrase data 32 and the model sentence data 33 that can be inserted into respective dictionary translations for each of the idiomatic phrases and model sentences.

There are various methods of performing this display, but normally, for example, only marks representing existing idiomatic phrases and model sentences are displayed with the content collapsed, and the content is switched by selecting the marks. Content display can also be carried out by displaying parts of the screen at the same time without switching the screen, or using a tele-view display.

One example of the structure of the idiomatic phrase data 32 and the model sentence data 33 is shown in FIG. 3 using model sentence data 33 as an example. The example shown in FIG. 3 is the simplest example, with model sentence numbers sequentially attached to extracted model sentences and placed next to them, and it is possible to store only the model sentence numbers in a corresponding region of the dictionary data body 31.

By extracting model sentences in his way, it is possible to carry out a model sentence keyword search at high speed.

However, this also takes time in a model sentence keyword search, which means that in order to carry out the search at high speed it is possible to have a data structure as shown in FIGS. 4A, 4B. FIG. 4A shows one example of a data structure for the model sentence data 33, and FIG. 4B shows a table for carrying out correlation for the data and model sentence numbers of FIG. 4A.

The data in FIG. 4A is a list produced by breaking down the model sentence data shown in FIG. 5A for each word by attaching a word number to each word, and a word number for the subsequent word is attached to each word. An initial word number is attached to the final word of a model sentence, as well as information indicating that it is the final word and a translation number.

With this type of data structure, words as keywords are searched and it is possible to assemble a predetermined model sentence from these words. For example, as shown in FIG. 5B, if "pen" is made a keyword, the word No. 6 is searched, and using the next word number 8 attached to "pen" the next word "this" is found, "is" is found from the next word No. 4 attached to "this", "a" is found from the next word No. 1 attached to "is", and the initial "pen" is returned to from the next word No. 6 attached to "a", thus completing the search. Also, since the initial word and final word of the model sentence contain information, it is easy to assembly the original model sentence "This is a pen." from the search result, and it is recognized that the translated sentence No. 1 "This is a pen." (in Japanese) follows on the next line. It is easy to display this search result as a list.

By having such a data structure there is the advantage that the speed of the keyword search can be increased considerably. Also, since an original model sentence is assembled from each of the broken down and sorted words, there is no duplication of data and memory saving is considerable.

A mark and a model sentence number are embedded in the translations of the normal search results at places corresponding to each model sentence, and when displaying model sentence content the model sentence is assembled from an initial word number corresponding to a model sentence number, from a table like that shown in FIG. 5, and displayed.

The specific structure of the above described structure is not particularly limited. For example, it is not necessary for both of the initial word and the final word to have that principal information, and just one of them can have it, and it is also possible to recognize whether it is the first word or final word by the fact that it is a model sentence number or a translation number. Also, the method of correlating with the model sentence number and the method of associating the translations for each model sentence number are not particularly limited.

Also, with this embodiment, the idiomatic phrase data 32 and the model sentence data 33 are data extracted from a plurality of dictionaries, for example an English to Japanese dictionary and an ordinary English dictionary, and collected together, which means that there is the advantage that it is possible to easily search through a plurality of dictionaries. In this case, as well as affixing an index indicating what dictionary data to each idiomatic phrase and model sentence it is possible to have the same structure as the above described data structure.

Figure 6:
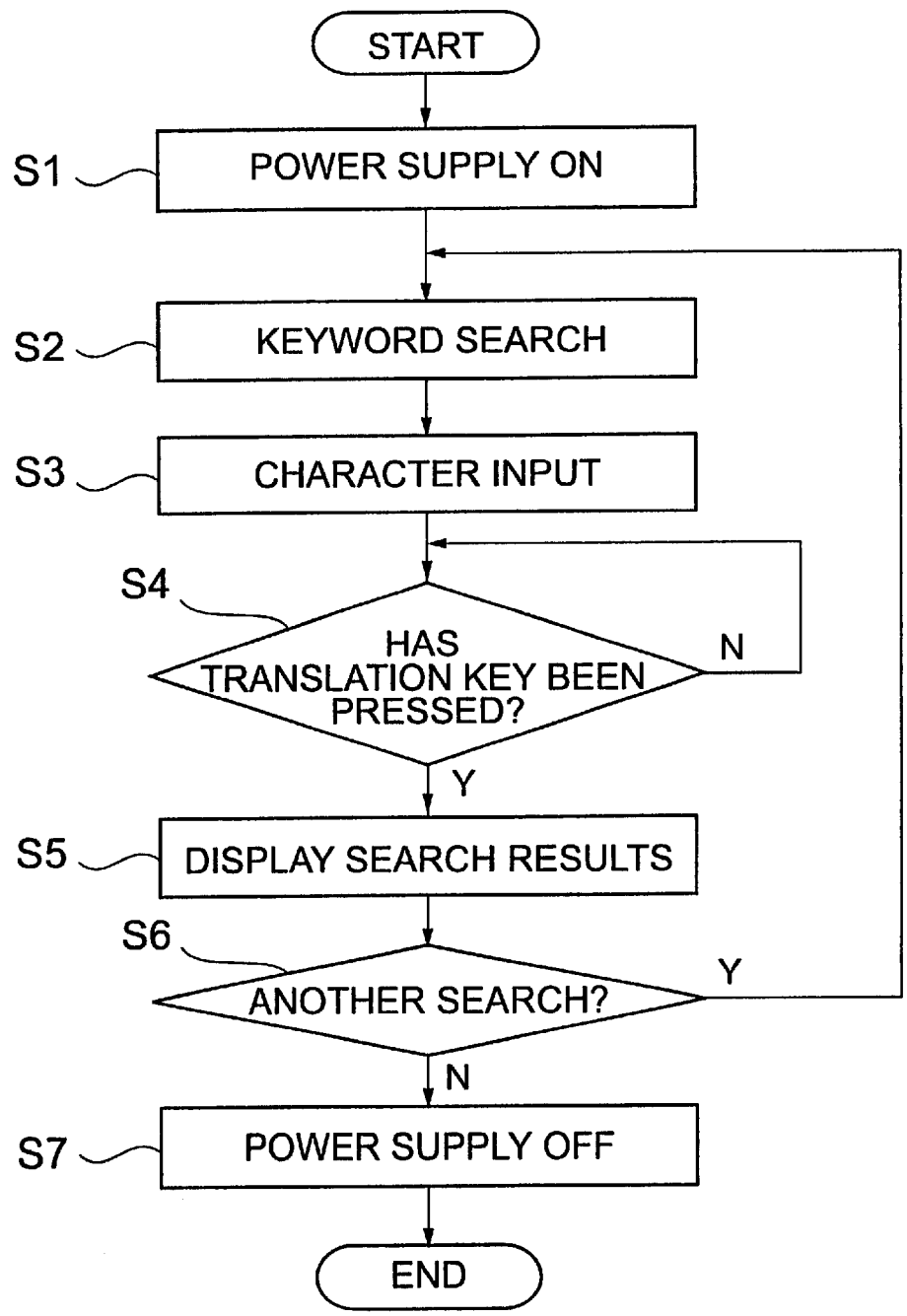
FIG. 6 is a flowchart showing one example of usage conditions of the electronic dictionary of one embodiment of the present invention.

The chain of operations for a model sentence search for the electronic dictionary of this embodiment will now be described with reference to the flowchart shown in FIG. 6. FIGS. 7A, 7B, 8A and 8B are drawings showing one example of a screen displayed in each step of FIG. 6.

Figure 7A:
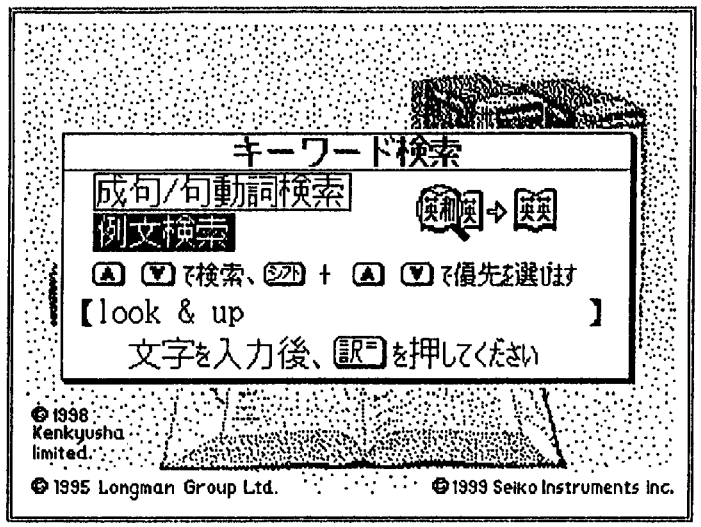
FIG. 7 is a drawing showing one example of a screen displayed in each step of FIG. 6.

First of all, in step S1, power to the electronic dictionary 10 is turned on using the power supply switch 49, and in step S2 if a keyword search is selected using the keyword search keys 46 a character input screen is displayed on the display device 50 by the display means 22. On this screen, and after an idiomatic phrase search or model sentence search has been selected, characters are input in step S3 using the character keys 41. This input character string is temporarily stored in RAM as a character string. The screen at this time is shown in FIG. 7A. FIG. 7A is an example where a model sentence search is selected, and "look" and "up" are input as keywords.

Figure 7B:
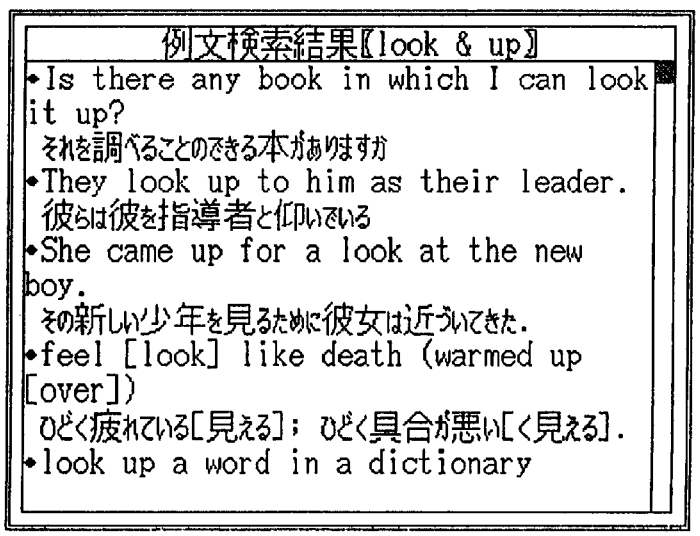
Figure 8A:
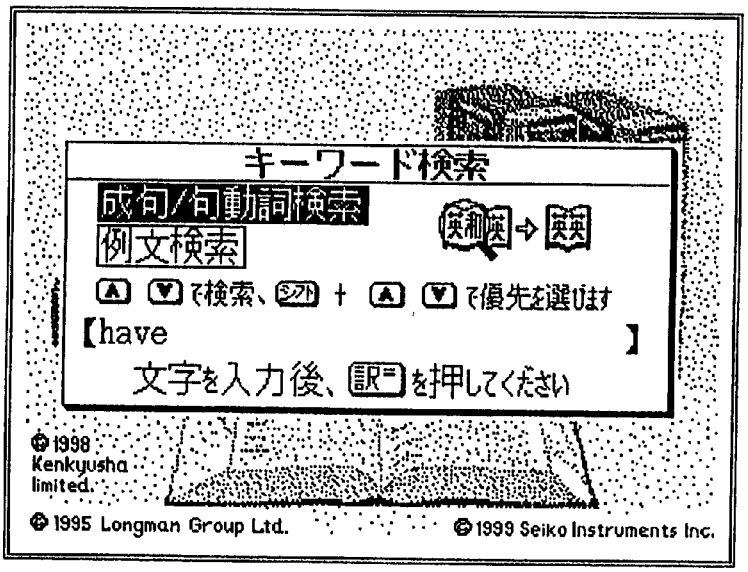
FIG. 8 is a drawing showing one example of a screen displayed in each step of FIG. 6.
Figure 8B:
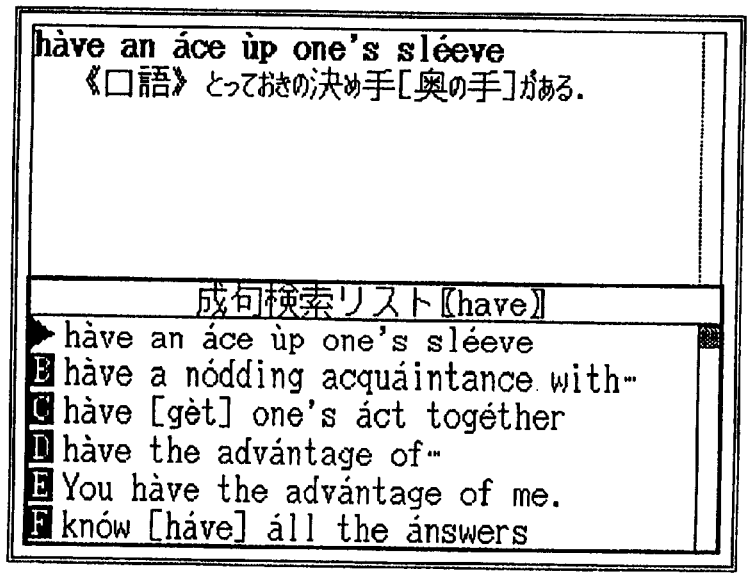

Next, in Step S4, it is judged whether or not the translation key 45 has been pressed, and if it has been pressed the search means 21 searches for model sentences including the keywords from the model sentence data 33 and temporarily stores results in a specified region of RAM. Then, model sentence search results are displayed in step S5, as shown in FIG. 7B. Also, FIG. 8A shows a screen where an idiomatic phrase search is selected and "have" is input as a keyword in step S3, and results of that search are shown in FIG. 8B. In this instance, a list of idiomatic phrases containing the word "have" is displayed on a lower half of the screen, and a translation for the idiomatic phrase at the top of the list is preview displayed at the upper half of the screen. In this preview mode, when the cursor is moved using the cursor keys 44, translations of other idiomatic phrases are sequentially preview displayed. By sequentially carrying out this preview display, it is easy to find an object idiomatic phrase. In this embodiment, the results of the idiomatic phrase search are preview displayed, but this is not limiting.

If another search is selected in step S6, step S2 is returned to, while if another search is not selected processing is terminated at step S7 by turning the power supply off.

With the electronic dictionary of this embodiment, idiomatic phrases and model sentences, particularly model sentences, can be searched at high speed, and by devising a data structure the effect of making it possible to further increase the speed and to considerably reduce a storage region is realized. Also, by collecting the idiomatic phrase and model sentence data together in a single item and holding it, it is possible to search through model sentences and idiomatic phrases in a plurality of dictionaries together at high speed.

As has been described above, with the electronic dictionary of the present invention, data for idiomatic phrases and model sentences are extracted from dictionary data and held, which makes it possible to search idiomatic phrases and model sentences, particularly model sentences, at high speed. Also, by appropriately devising the data structure of the idiomatic phrases and model sentences, it will become possible to further increase the speed, and also to reduce the required memory region considerably. Further, by collecting the idiomatic phrase and model sentence data together in a single item and holding it, it is possible to search through model sentences and idiomatic phrases in a plurality of dictionaries together at high speed.

What is claimed is:

1. In an electronic dictionary having a memory for storing dictionary data including individual word translations corresponding to word entries and sub-information comprising model sentences and idiomatic phrases relating to the word entries, and translations of the model sentences and idiomatic phrases, wherein:

at least the model sentence data of the sub-information is extracted from the dictionary data and stored in the memory separately from the individual word translations in the form of sub-dictionary data so that the model sentence data may be accessed directly without accessing the individual word translations;

an address pointer is provided at a position in the dictionary data indicating where the sub-information is embedded for associating respective sub-information with the dictionary data; and the sub-dictionary data is provided with model sentence and idiomatic phrase lists comprising individual words broken down from the model sentences and the idiomatic phrases, and each of the individual words are stored along with restoration data affixed to each of the individual words for restoring the model sentences and the idiomatic phrases.

2. An electronic dictionary according to claim 1; wherein the dictionary data includes a plurality of dictionary data items, and the sub-information data comprises a single data item.

3. An electronic dictionary according to claim 1; further comprising keyword search means for searching model sentences and idiomatic phrases using the sub-dictionary data.

4. An electronic dictionary comprising: an input unit for permitting user entry of searchable words; a display for displaying words; a control unit for performing word searches; and a memory for storing dictionary data comprised of individual word translations corresponding to searchable words, and sub-information comprised of at least one of model sentences and idiomatic phrases relating to the searchable words and translations of the model sentences and idiomatic phrases, the sub-information being stored separate from the word translations and being accessible without accessing the word translations, the sub-information comprising all of the respective words of the model sentences and idiomatic phrases broken down into individual words, each individual word being stored in the memory along with an address pointer indicating a memory address of a next word in a respective model sentence or idiomatic phrase which includes the individual word.

5. An electronic dictionary according to claim 4; wherein the word translations are stored in the memory along with an address pointer indicating an address of corresponding sub-information for associating the corresponding sub-information with the word translations.

6. An electronic dictionary according to claim 4; wherein an indicator is stored along with each individual word to identify a model sentence or idiomatic phrase which includes the individual word.

7. An electronic dictionary according to claim 4; wherein the control unit includes keyword search means for searching model sentences and idiomatic phrases using the sub-dictionary data.

8. An electronic dictionary comprising: an input unit for permitting user entry of searchable words; a display for displaying words; a control unit for performing word searches and outputting obtained words to the display unit; and a memory for storing searchable words in a plurality of different languages and for storing phrases containing the searchable words in the plurality of different languages, the phrases being stored separate from the searchable words, being accessible without accessing the searchable words, and being stored in the memory broken down into individual words, each individual word being stored along with an address pointer indicating a memory address of a next word in a respective phrase which includes the individual word.

9. An electronic dictionary according to claim 8; wherein the searchable words are stored in the memory along with an address pointer indicating an address of corresponding phrase for associating the corresponding phrase with the searchable word.

10. An electronic dictionary according to claim 8; wherein an indicator is stored along with each individual word to identify a phrase which includes the individual word.

* * * * *